March 24, 1936.  J. W. LOGAN, JR  2,035,087
BRAKE CONTROL APPARATUS
Filed Oct. 10, 1934    2 Sheets-Sheet 1
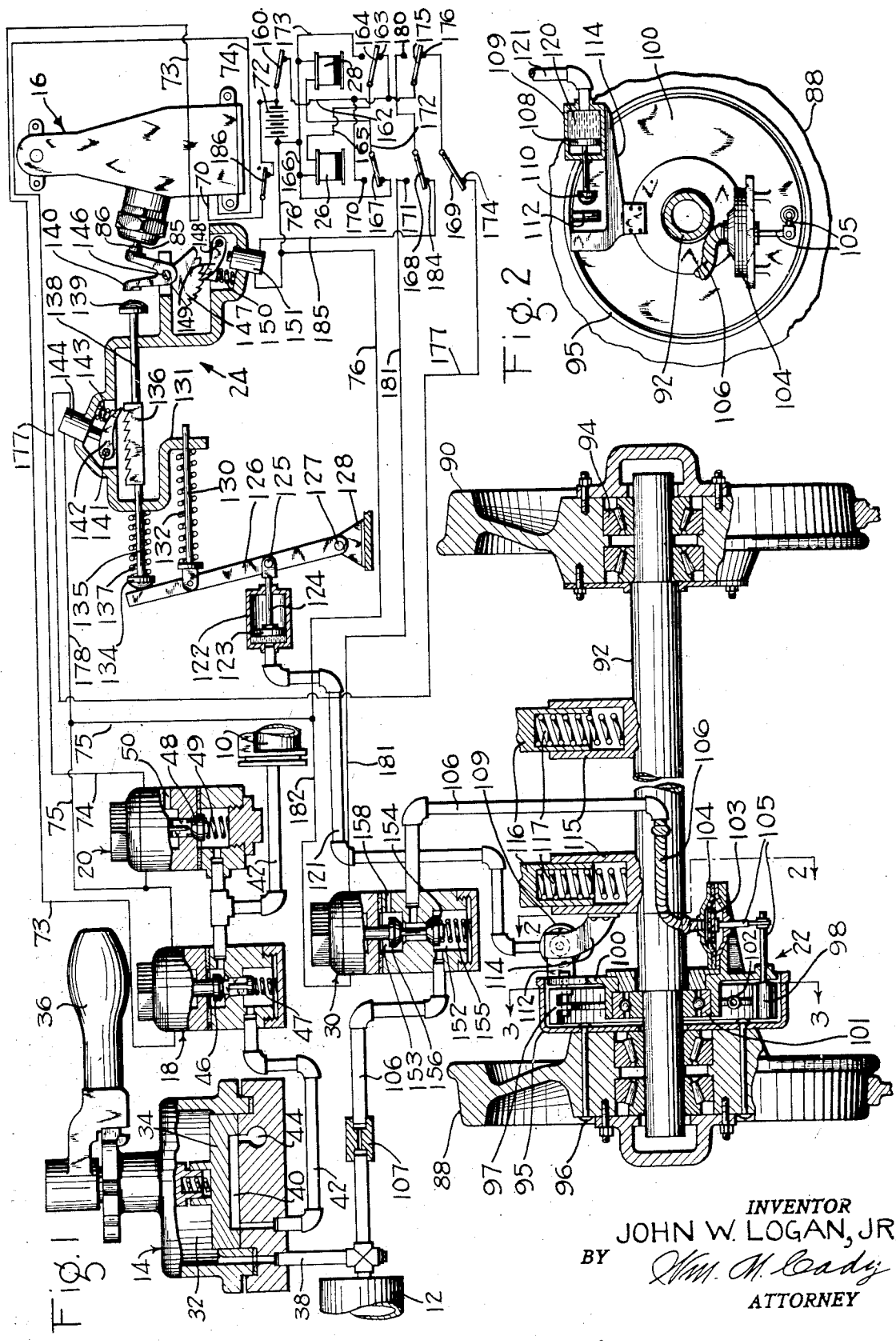
INVENTOR
JOHN W. LOGAN, JR.
BY Wm. N. Cady
ATTORNEY March 24, 1936.  J. W. LOGAN, JR  2,035,087
BRAKE CONTROL APPARATUS
Filed Oct. 10, 1934    2 Sheets-Sheet 2
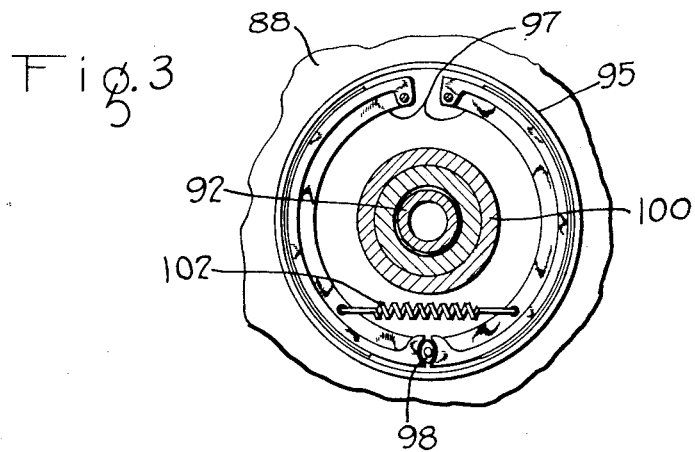
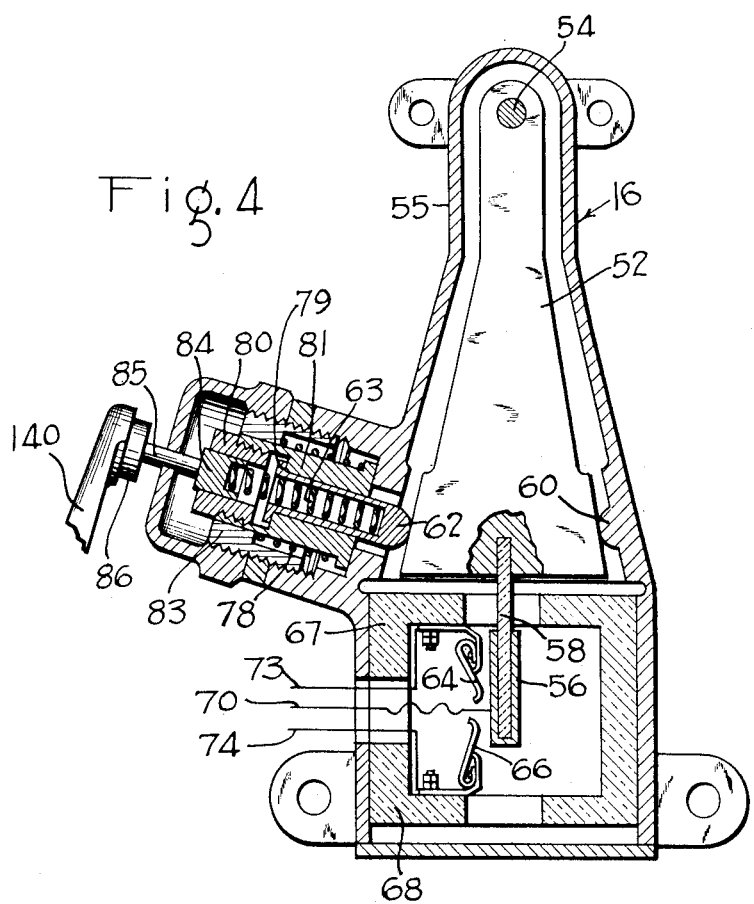
INVENTOR
JOHN W. LOGAN, JR.
BY
ATTORNEY Patented Mar. 24, 1936

2,035,087

UNITED STATES PATENT OFFICE 2,035,087

BRAKE CONTROL APPARATUS

John W. Logan, Jr., Edgewood, Pa., assignor to The Westinghouse Air Brake Company, Wilmerding, Pa., a corporation of Pennsylvania Application October 10, 1934, Serial No. 747,733

23 Claims. (Cl. 303—24)

This invention relates to brake control apparatus, and more particularly to apparatus for controlling the brakes on trains and traction vehicles in accordance with the adhesion between the vehicle wheels and track rails.

When trains and traction vehicles are operated at relatively high speeds, it is necessary to apply high retarding forces in order to bring the vehicle or train to a stop in a reasonably short time. When high retarding forces are applied there is considerable danger of the wheels sliding as the speed of the train or vehicle diminishes and the coefficient of friction between braking parts increases. Wheel sliding is objectionable because the retarding force produced by sliding wheels is less and because uneven wear is caused on the wheels.

It has heretofore been proposed to control the retarding forces applied to a vehicle or train by controlling the rate of retardation produced by application of the brakes, and this has been accomplished by employing what is known as a retardation controller device. If the track conditions on a railway system were always the same and uniform on a given track line, then the retardation controller device could have a fixed setting so that the brakes could be applied to produce the maximum rate of retardation permitted by the coefficient of adhesion between vehicle wheels and track rails. The train or vehicle could then be brought to a stop in the shortest possible time, and the danger of wheel sliding would be greatly minimized if not entirely eliminated.

As a practical matter however, rail conditions vary over wide limits, due partly to weather conditions and partly to conditions of the rails and vehicle wheels, so that it is rarely possible to preset the retardation controller device for a fixed rate of retardation which would be suitable for the varying conditions encountered. Further, it is most generally impracticable to manually adjust the setting of the retardation controller device to meet the varying track conditions while the train or vehicle is running, so that the setting of the retardation controller usually corresponds to the rate of retardation which can be maintained under average track conditions. With such a setting it will be obvious that for poor rail conditions there may result considerable sliding of the wheels, whereas for good rail conditions stops will not be made in the shortest possible time.

The maximum retarding force which may be applied to a vehicle wheel is limited by the coefficient of adhesion between the wheel and track rail. In general, this maximum retarding force is equivalent to the product of the coefficient of adhesion and the force with which the wheel presses on the rail. The braking of a vehicle is therefore said to be limited by the adhesion between wheels and rails, and the braking force which will just produce sliding of a wheel is therefore a measure of the adhesion between the wheel and rail. Where the term "adhesion" is used herein it is to be understood as referring to the coefficient of adhesion.

Generally speaking therefore, it is a principal object of my invention to provide a brake control apparatus which will so control an application of the brakes as to permit a vehicle or train to be brought to a stop in the shortest possible time permitted by existing track conditions, without danger of wheel sliding.

Another object of my invention is to provide a mechanism which will accurately measure the equivalent of the coefficient of adhesion between the vehicle wheels and rails at regular intermittent intervals and to thereafter, as each measurement is made, condition the brake controlling apparatus so as to limit the rate of retardation produced by an application of the brakes to a value which will not cause sliding of the wheels.

A still further object of this invention is to provide a retardation controller device for controlling applications of the brakes according to the rate of retardation, and means for continuously adjusting at periodic intervals the setting of the retardation controller device to correspond to the adhesion between the vehicle wheels and rails while the vehicle or train is running.

More specific objects of my invention will appear from the following description, which I have illustrated in the attached drawings by one form that my invention may take, wherein, Figure 1 is a schematic and somewhat diagrammatic view of this embodiment shown in a simple form.

Figure 2 is a partial view of the adhesion measuring mechanism shown in Figure 1, taken along the line 2—2.

Figure 3 is a like view taken along the line 3—3.

Figure 4 is a diagrammatic view of the retardation controller device shown in Figure 1.

In order to show in a simple way the application of my invention to a brake system, I have in the embodiment of Figure 1 shown a simple straight air brake system comprising a brake cylinder 10, to which fluid under pressure may be supplied from a reservoir 12 by operation of a straight air brake valve device 14. For controlling the rate of retardation produced by an application of the brakes, so as not to cause sliding of the wheels, I have provided a retardation controller device 16, a cut-off magnet valve device 18, and a release magnet valve device 20. These two magnet valve devices are interposed in the piping between the brake valve device 14 and the brake cylinder 10, and, as will hereinafter more fully appear, are controlled by the retardation controller device to cut off the supply of fluid under pressure to the brake cylinder 10 at one rate and to release fluid pressure therefrom at another rate.

For measuring the equivalent of the coefficient of adhesion between the vehicle wheels and track rails, I have provided an adhesion measuring apparatus, designated generally at 22. Cooperating with the adhesion measuring apparatus 22 to set the retardation controller device 16 in accordance with the coefficient of adhesion between the wheels and rails, I have provided an adjusting mechanism, designated generally at 24.

For effecting intermittent measuring of the adhesion and intermittent setting of the retardation controller device, I have provided electrical relays 26 and 28, and a supply and release magnet valve device 30.

Considering now more in detail the apparatus enumerated above, the straight air brake device 14 is embodied in a casing having a rotary valve chamber 32, in which is disposed a rotary valve 34 adapted to be operated by a handle 36. The rotary valve chamber 32 is in constant communication with the reservoir 12, which forms a source of fluid under pressure, by way of pipe 38. When the handle 36 is in release position, cavity 40 in the rotary valve 34 connects pipe 42, leading to the brake cylinder 10, with the atmosphere, by way of exhaust port 44. When the handle 36 is moved to application position, this communication with the atmosphere is cut off and the pipe 42 is connected to the rotary valve chamber 32, and hence with the reservoir 12.

As is indicated in Figure 1, all flow of fluid from the reservoir 12 to the brake cylinder 10 must pass through the cut-off magnet valve device 18. This valve device is embodied in a casing containing a valve chamber in which is disposed a valve 46, urged toward an unseated position by a spring 47 and toward a seated position by an electromagnet in the upper part of the valve device casing, which when energized actuates the valve downwardly.

When in unseated position, the valve 46 permits flow from the brake valve device 14 to the brake cylinder 10, and when in seated position the valve cuts off this flow.

The cut-off magnet valve device 18 is embodied in a casing having a chamber in which is disposed a valve 48, urged toward a seated position by a spring 49 and toward an unseated position by action of an electromagnet in the upper part of the casing, which when energized actuates the valve downwardly.

The valve 48 controls a communication from the brake cylinder 10 leading to the atmosphere by way of port 50. When the valve 48 is in unseated position, fluid pressure in the brake cylinder 10 is released through this communication to the atmosphere by way of port 50, and when the valve 48 is in seated position this communication is cut off.

The retardation controller device 16, which is more completely shown in Figure 4, comprises a body 52, in the form of a pendulum, suspended at 54 in a casing or housing 55 and carrying a contact 56 insulated therefrom by means of an insulating member 58. The body 52 is normally held in a neutral position between a fixed stop 60 and a movable plunger 62, by action of an inner spring 63.

The casing 55 is secured to some part of the vehicle in a manner such that during deceleration of the vehicle the body 52 swings to the left according to the rate of retardation. When the body 52 thus swings to the left, movable contact 56 may first engage a stationary contact 64 and subsequently another stationary contact 66. The stationary contacts 64 and 66 are carried and supported by insulating members 67 and 68, respectively.

The movable contact 56 is connected by conductor 70 to one terminal of a battery 72, or other source of current supply, and the stationary contact 64 is connected by conductor 73 to one terminal of the electromagnet in the cut-off magnet valve device 18, while the other stationary contact 66 is connected by conductor 74 to one terminal of the electromagnet in the release magnet valve device 20. The other terminal of each of the electromagnets in these magnet valve devices is connected by conductors 75 and 76 to the opposite terminal of the battery 72. Thus when the movable contact 56 engages the stationary contact 64, the valve 46 in the cut-off magnet valve device 18 is caused to be seated, and when the movable contact engages the stationary contact 66, the valve 48 in the release magnet valve device 20 is caused to be unseated.

Movement of the pendulum body 52 is opposed first by the inner spring 63 and subsequently by an outer spring 78. When the inner spring 63 has been compressed a predetermined amount, a flange 79 on the plunger 62 engages a stop 80 and further movement of the body 52 actuates a sleeve member 81 against opposition of the outer spring 78, while the inner spring 63 continues to oppose movement of plunger 62.

Thus when the vehicle is decelerating, the inner spring 63 will be compressed to the point where flange 79 engages stop 80, at one rate of retardation, and both the inner and outer springs will be then compressed at a slightly higher rate of retardation.

The two springs 63 and 78, and the parts associated therewith, are so designed that when the movable contact 56 will have engaged the stationary contact 64, the flange 79 will have engaged stop 80, and when movable contact 56 will have engaged stationary contact 66, the outer spring 78 will have been compressed to a given degree.

Tension on the outer spring 78 may be regulated by an adjusting member 83, while tension on the inner spring 63 may be regulated by a slidable plunger 84 having a stem 85 associated therewith and terminating in a button head 86.

The tension on the inner spring 63 is adjusted at regular intervals according to the adhesion between the vehicle wheels and rails, as measured by the adhesion measuring apparatus 22. This apparatus comprises a pair of wheels 88 and 90, rotatably disposed on a non-rotating shaft 92, through roller bearings 94, and adapted to roll on the two track rails. Associated with the wheel 88 is an internal expanding, automotive type brake device having a drum 95 secured to the wheel, as by rivets 96, and having internally expanding shoes 97 adapted to engage the inner periphery of the drum 95 upon rotation of a cam 98.

The shoes 97 and the cam 98 are carried by a supporting plate member 100, rotatably disposed on the shaft 92 through the medium of ball bearings 101. As is common practice in automotive type brake devices, the shoes 97 are normally held out of engagement with the brake drum 95 by a spring 102. The cam 98 is rotated to cause engagement of the shoes with the brake drum by action of a diaphragm 103 in a cylinder 104, upon the supply of fluid under pressure to one side of the diaphragm. Movement of the diaphragm rotates the cam 98 through operation of levers 105. Fluid under pressure to operate the diaphragm 103 is supplied from the reservoir 12, through pipe 106 and a choke device 107 having a restriction therein, and the flow to the cylinder 104, as well as release of pressure therefrom, is controlled by the aforementioned magnet valve device 30.

Because the brake shoes 97 are carried by the rotatable plate 100, when the shoes engage the brake drum 95 the plate 100 tends to rotate with the drum. Rotation of the plate 100 is opposed by a piston 108 in an hydraulic cylinder 109, the piston 108 having a stem terminating in a button head 110 which is adapted to engage a lug 112 secured to the plate 100.

The cylinder 109 is secured to and carried by a bracket 114, which is in turn secured to one of two spring housings 115, which are preferably rigidly secured to the axle 92. Each of the spring housings has telescoping therewith a spring sleeve member 116, which may be secured to the vehicle proper, and interposed between each of the sleeve members 116 and housing members 115 is a spring 117, the purpose of which is to cause the two wheels 88 and 90 to be pressed into engagement with the track rails with a definite force.

The two wheels 88 and 90 are not intended to carry any part of the vehicle load, but are pressed into engagement with the track rail with a force substantially constant and practically unaffected by the vehicle load. The springs 117 may even be omitted if desired and the force of gravity of the wheels alone relied upon.

When the brake shoes 97 engage the brake drum 95 and are caused to rotate therewith, the lug 112 engages the button 110 and piston 108 is forced to the right, as viewed in Figure 2, in cylinder 109. A suitable liquid 120, such for example as the type of oil commonly used in hydraulic brake systems, is disposed to the right of piston 108 and is thereby placed under pressure and flows through pipe 121 to a second cylinder 122, where it forces piston 123 in this cylinder to the right.

The piston 123 has a stem 124 pivotally connected at 125 to a lever 126. The lever 126 has one end thereof pivotally connected at 127 to a bracket 128 secured to some rigid part of the vehicle. Adjacent the other end of the lever 126 is pivotally secured a stem 130, which has its other end slidably disposed in a bore in a supporting frame 131. Concentrically disposed on the stem 130 is a spring 132, which normally urges the upper end of the lever 126 in a counterclockwise direction, but when piston 123 moves to the right the upper end of lever 126 is urged in a clockwise direction against opposition of this spring.

The extreme upper end of the lever 126 engages a button head 134 of a stem 135 associated with a ratch 136. Concentrically disposed on the stem 135 is another spring 137, which operates to hold the ratch 136 to a biased or left hand position.

The ratch 136 has a second stem 138 associated therewith, which stem terminates in another button head 139 adapted to engage one arm of a bell crank lever 140 to actuate the slidable plunger 84 in the retardation controller device 16.

Pivotally mounted at 141 and disposed above the teeth in the ratch 136 is a pawl 142 normally urged downwardly by a spring 143. The pawl 142 is adapted to be actuated upwardly by an electromagnet 144, which when energized attracts the pawl theretoward.

The bell crank lever 140 is pivotally mounted at 146 and has integral therewith a segmental ratch 147. Disposed below the segmental ratch 147 and pivotally mounted at 148 is a second pawl 149, which is normally urged toward engagement with the teeth of the ratch 147 by a spring 150. The pawl 149 may be withdrawn from engagement with the ratch 147 by action of an electromagnet 151, which when energized attracts the pawl theretoward.

The aforementioned supply and release electromagnet 30 is embodied in a casing provided with a supply valve chamber 152 and a release valve chamber 153. Disposed in the supply valve chamber 152 is a supply valve 154 normally urged toward seated position by a spring 155. Disposed in the release valve chamber 153 is a release valve 156, which is urged toward unseated position by the spring 155. The supply valve 154 is urged toward unseated position and the release valve 156 toward seated position by action of an electromagnet in the upper part of the valve device casing, which when energized actuates the two valves downwardly.

When the release valve 156 is seated and the supply valve 154 is unseated, fluid under pressure may flow from the reservoir 12 to the cylinder 104, and when the supply valve 154 is seated and the release valve 156 is unseated, this flow is cut off and fluid pressure in the cylinder 104 is released to the atmosphere by way of port 158.

Energization of the electromagnet in the magnet valve device 30, as well as energization of the two electromagnets 144 and 151, is controlled by the two aforementioned relays 26 and 28. The manner in which these two relays control operation of these electromagnets will be more fully described in connection with the description of the operation of the embodiment of the invention.

The operation of this embodiment of my invention is as follows:

When a train or vehicle with which the embodiment is associated is running, the brake valve handle 36 is maintained in release position. Also, at all times during operation of the train or vehicle a switch 160 is maintained closed, as shown in Figure 1. Closing of this switch sets into operation the adhesion measuring apparatus 22 and the adjusting mechanism 24, which causes the retardation controller device 16 to be periodically reset according to the adhesion between wheels and rails. Assuming for the sake of simplicity, that the switch 160 has just been closed, the following sequence of operation takes place:

When switch 160 is initially closed, relay 26 is energized from the battery 72 through a circuit including switch 160, conductor 162, contact 163 and contact arm 164 of relay 28, and conductor 165, the return circuit to the other terminal of the battery 72 being by way of conductor 166. Both of relays 26 and 28 are slow acting relays, that is, a definite interval of time elapses after either energization or deenergization before the relays operate. Therefore, a predetermined time after relay 26 has been energized, it actuates its contact arms 167, 168 and 169 upwardly. Contact arm 167 will then engage contact 170 to complete a circuit from the battery 72 to the relay 28, which circuit includes conductor 162, contacts 170 and 167, and conductor 172, the return circuit to the other terminal of the battery 72 being by way of conductor 173. However, since relay 28 is a slow acting relay, it will not actuate its contact arms upwardly until a predetermined interval of time elapses and during this interval contact arm 168 will be in engagement with contact 171, and contact arm 169 will be disengaged from contact 174.

Engagement of contact arm 168 with contact 171 is of no effect at this time, because contact arm 175 of relay 28 is in a down position. However, disengagement of contact arm 169 from contact 174 deenergizes the formerly energized electromagnet 144, by interrupting the circuit from the battery 72, which circuit included switch 160, conductor 162, contact arm 175 and contact 176 of relay 28, contact arm 169 and contact 174 of relay 26, and conductor 177, the return circuit to the other terminal of the battery 72 being by way of conductors 178, 75 and 76. The pawl 142 therefore drops to engagement with the teeth of ratch 136.

Relay 28 now actuates its contact arms 164 and 175 upwardly. When contact arm 164 disengages from contact 163, relay 26 is deenergized, but holds its contact arms upwardly for a predetermined interval of time. Engagement of contact arm 175 with contact 180 causes energization of the electromagnet in the magnet valve device 30, through a circuit from battery 72 including switch 160, conductor 162, contacts 175 and 180 of relay 28, contacts 168 and 171 of relay 26, and conductor 181, the return circuit to the other terminal of the battery being by way of conductors 182 and 76.

Energization of this electromagnet causes unseating of the supply valve 154 and seating of the release valve 156. Fluid under pressure therefore flows from the reservoir 12 through choke 107, which limits the flow to a definite rate, and past the unseated supply valve 154 to the cylinder 104, to cause engagement of the brake shoes 97 with the drum 95. The brake on wheel 88 is therefore applied at a definitely increasing rate.

The degree of pressure of the fluid thus supplied to the cylinder 104 will always rise high enough to cause sliding of wheel 88. Therefore, as the automotive brake on this wheel is applied, the lug 112 associated with the plate 100 will exert a constantly increasing force on the piston 108 in cylinder 109 up to the point where wheel 88 begins to slide. The pressure applied to piston 108 is of course manifested on the piston 123, through the medium of the hydraulic fluid 120. Lever 126 therefore actuates the ratch 136 to the right, and the ratch will be actuated the maximum distance to the right at the instant just before wheel 88 begins to slide.

As wheel 88 begins to slide, the torque exerted on plate 100 will diminish, and consequently the force actuating ratch 136 to the right will diminish. However, since the pawl 142 is now in engagement with the ratch, the ratch will be held in substantially the same position to the right to which it has been actuated.

During this operation the button head 139 may or may not be in engagement with the left arm of the bell crank lever 140. If in engagement, a tension will be placed upon the inner spring 63, in the retardation controller device, in accordance with the position of the ratch 136 to the right.

If however the bell crank lever 140 has previously been actuated to a position where the button head 139 does not engage the left arm of the bell crank, then the tension on the inner spring 63 will be greater than that corresponding to the position of the ratch 136.

Since relay 26 is now deenergized, its contact arms will by this time have dropped to lower position, where contact arm 168 engages contact 184, to energize the electromagnet 151 from battery 72, through a circuit including switch 160, conductor 162, contacts 175 and 180 of relay 28, contacts 168 and 184 of relay 26, and conductor 185, the return circuit to the upper terminal of battery 72 being by way of conductor 76. Energization of electromagnet 151 draws the pawl 149 downwardly so that bell crank 140 may now engage button head 139, if it has not already done so beforehand. This then insures that the tension on the inner spring 63 corresponds to the position of the ratch 136 to the right.

At the same time, disengagement of contact arm 168 from contact 171 deenergizes the electromagnet in the magnet valve device 30, so that supply valve 154 is seated and release valve 156 is unseated. As a consequence, the supply of fluid under pressure to the cylinder 104 is cut off and pressure in this cylinder is released to the atmosphere through the port 158. The brake on wheel 88 is thus released and the wheel may thereafter again rotate at a speed corresponding to the speed of the vehicle.

When contact arm 167 disengages from contact 170, relay 28 is deenergized and after a predetermined interval of time permits its contact arms 164 and 175 to drop to lower position. When contact arm 175 disengages from contact 180, the circuit to the electromagnet 151 will be broken and this electromagnet will be deenergized. Pawl 149 will then again engage the ratch 147 to hold the setting of the retardation controller device. Engagement of contact arm 175 with contact 176 energizes electromagnet 144, to withdraw pawl 142 from engagement with ratch 136, and the ratch returns to its left hand or biased position. Engagement of contact arm 164 with contact 163 again energizes relay 26, and the cycle of events just described is repeated.

The time required to complete each cycle of operation can of course be varied according to the frequency of adjustment of the retardation controller device desired. However the timing of the cycle must be long enough to insure that all of the stages will occur. As one example, it has been found that a time of six seconds will insure proper operation of the embodiment shown.

If for example then the cycle of operation is timed to take place in say six seconds, the setting of the retardation controller device will take place every six seconds, so that when an application of the brakes is effected by moving the brake valve handle 136 to application position, the pressure in the brake cylinder 10 will be so controlled as to permit the maximum rate of retardation permissible under the existing track conditions. When the rate of retardation will have reached a point where inner spring 63 will have been compressed to the point where movable contact 56 engages contact 64, the supply of fluid under pressure to the brake cylinder 10 will be cut off by the seating of cut-off valve 46 in magnet valve device 18. If the rate of retardation should increase to the point where the outer spring 78 is compressed, then engagement of movable contact 56 with stationary contact 66 will cause unseating of release valve 48 in magnet valve device 20 to release pressure from the brake cylinder 10 until the rate will have diminished to the point where contact 56 disengages from contact 66.

Now since the coefficient of adhesion between the wheel 88 and the rail may be the same as or bear a fixed relation to that between the load bearing wheels and the rails, it follows that the parts may be so designed that the retardation controller device will be set for a maximum rate of retardation which can be maintained with the adhesion value measured, without sliding of the wheels. Therefore, with the retardation controller device thus set, the maximum braking force which may be applied to the load bearing wheels will not quite produce wheel sliding, and the maximum permissible rate of retardation can then be safely maintained.

When applying the brakes, the operator may move the brake valve handle 36 to application position where it is left. Thereafter, as described, the retardation controller device 16 takes control and insures that the train or vehicle is brought to a stop in the shortest possible time. If however the operator should thereafter desire to retain control of the application by manipulation of the brake valve device, he may open switch 186, thereby rendering the retardation controller device ineffective and he may then vary the brake cylinder pressure according to manipulation of the brake valve device.

It will be noted that the wheel 90 has no function other than to support one end of the axle 92. Measuring of the adhesion between wheels and rails takes place only between wheel 88 and the rail upon which it rolls. Therefore, if desired, the wheel 88 and a shorter axle could be supported upon a bracket from the vehicle and the wheel 90 dispensed with. In general, however, it is believed that both wheels would be preferred in practice so as to present a more uniform appearance than might result if the wheel 90 were omitted.

It will of course be appreciated that many changes and modifications may be made in the invention, and that it may be adapted to other than the simple straight air brake equipment shown, and I do not therefore wish to be limited to the specific embodiment shown, or otherwise than by the spirit and scope of the appended claims.

Having now described my invention, what I claim as new and desire to secure by Letters Patent, is:

1. In a vehicle brake apparatus, the combination with means for effecting an application of the brakes, of an element adapted to engage a track rail, means operating at periodic intervals for determining the adhesion between said element and rail, and means for controlling the application of the brakes in accordance with the adhesion determined between said element and rail.

2. In a vehicle brake system, the combination with a brake cylinder for braking the vehicle and a wheel adapted to roll on a track rail, of means for effecting a supply of fluid under pressure to said brake cylinder, means operable to periodically produce a braking effect on said wheel independently of that produced on the vehicle and to a degree sufficient to cause said wheel to slide, means for controlling the supply to said brake cylinder according to the rate of retardation and providing for variable settings thereof, and means operable intermittently in response to said braking means for effecting a setting of said last mentioned means in accordance with the braking effect which produces sliding of said wheel.

3. In a vehicle brake system, the combination with a brake cylinder for braking the vehicle and a wheel adapted to roll on a track rail, of means for effecting a supply of fluid under pressure to said brake cylinder, means including a retardation controller device for controlling the supply of fluid under pressure to said brake cylinder, means automatically operable to intermittently produce a braking effect on said wheel independently of that produced on the vehicle and to a degree sufficient to slide said wheel, means providing for variable settings of said retardation controller device, and means operable in response to said intermittently operated brake means for effecting a setting of said retardation controller device in accordance with the braking effect which produces sliding of said wheel.

4. In a vehicle brake system, the combination with a brake cylinder for braking the vehicle and a wheel adapted to roll on a track rail, of means for supplying fluid under pressure to said brake cylinder, means including a retardation controller device for controlling the supply of fluid under pressure to said brake cylinder, regulating means for varying the setting of said retardation controller device, brake means for periodically producing a braking effect on said wheel independently of that produced on the vehicle and to a degree sufficient to cause sliding of said wheel, and means rendered operable upon braking of said wheel to effect a setting of said retardation controller device corresponding substantially to the braking effect on said wheel at the instant said wheel begins to slide.

5. In a vehicle brake apparatus, the combination with a wheel adapted to roll on a track rail, of a brake device operable to produce a braking effect on said wheel to a degree sufficient to cause sliding of said wheel, means for effecting periodic operation of said brake device, a retardation controller device providing for variable settings thereof, and means operable to effect a setting of said retardation controller device corresponding to the braking effect which produces sliding of said wheel.

6. In a vehicle brake system, the combination with a wheel adapted to roll on a track rail, of a brake device operable to produce a braking effect on said wheel to a degree sufficient to cause sliding of said wheel, a retardation controller device having an element operable to adjust the setting thereof, means operable to effect a periodic operation of said brake device, and means operable to exert a pressure on said element in said retardation controller device corresponding to the braking effect which produces sliding of said wheel.

7. In a vehicle brake system, in combination, a wheel adapted to roll on a track rail, a fluid pressure brake device operable to produce a braking effect on said wheel to a degree sufficient to cause sliding of said wheel, a magnet valve device for controlling the supply of fluid under pressure to and its release from said brake device, a retardation controller device having a spring adapted to have the tension thereon varied, regulating means for varying the tension on said spring in accordance with the braking effect which causes sliding of said wheel, and electrical relays for controlling said magnet valve device and regulating means and operable to cause intermittent operation of said magnet valve device and regulating means to effect intermittent settings of said retardation controller device.

8. In a vehicle brake system, in combination, a wheel adapted to roll on a track rail, a brake device operable to produce a braking effect on said wheel, fluid pressure means for actuating said brake device, magnet valve means operable to supply fluid under pressure to said fluid pressure means to a degree sufficient to cause sliding of said wheel, a retardation controller device providing for adjustable settings thereof, means operable to vary the setting of said retardation controller device, and hydraulic means responsive to the braking effect produced by said brake device for actuating said last means.

9. In a vehicle brake system, in combination, a wheel adapted to roll on a track rail, a brake device having a brake drum and brake shoes operable to produce a braking effect on said wheel, a rotatable member carrying and supporting said brake shoes and adapted to be rotated when said shoes engage said drum, hydraulic means for opposing rotation of said rotatable member, a retardation controller device adapted to be adjustable, and means actuated by said hydraulic means for adjusting said retardation controller device.

10. In a vehicle brake system, the combination with a wheel adapted to roll on a track rail, of a fluid pressure brake device operable to produce a braking effect on said wheel, a magnet valve device operable when energized to effect a supply of fluid under pressure to said brake device to a degree sufficient to cause sliding of said wheel and operable when deenergized to effect a release of fluid pressure from said brake device, a retardation controller device providing for adjustable settings thereof, means including an electromagnet for effecting a setting of said retardation controller in accordance with the braking effect which causes sliding of said wheel, means including another electromagnet for retaining the setting of said retardation controller when said brake device is released, and relays for effecting intermittent energization and deenergization of said magnet valve device and said electromagnets, whereby said retardation controller device is periodically reset according to the braking effect which produces sliding of said wheel.

11. In a vehicle brake system, the combination with a wheel adapted to roll on a track rail, of brake means operable to produce a braking effect on said wheel to a degree sufficient to cause sliding of said wheel, a retardation controller device providing for variable settings thereof, means operable to effect a setting of said device in accordance with the braking effect which produces sliding of said wheel, slow acting relays operable to control operation of said brake means, and means whereby deenergization of one of said relays effects energization of the other of said relays.

12. In a vehicle brake system, the combination with a wheel adapted to roll on a track rail, of brake means operable to produce a braking effect on said wheel to a degree sufficient to cause sliding of said wheel, a retardation controller device providing for variable settings thereof, means operable to effect a setting of said retardation controller device in accordance with the braking effect which produces sliding of said wheel, relays for controlling operation of said brake means, and means whereby each of said relays controls energization and deenergization of the other of said relays to effect intermittent operation of said brake means.

13. In a vehicle brake system, the combination with a wheel adapted to roll on a track rail, of a fluid pressure brake device for producing a braking effect on said wheel, a magnet valve device operable when energized to effect a supply of fluid under pressure to said brake device to a degree sufficient to cause sliding of said wheel and operable when deenergized to effect a release of fluid pressure from said brake device, means for controlling the rate of retardation of the vehicle, means for controlling said retardation controlling means according to the braking effect produced on said wheel, a pair of slow acting relays controlling operation of said magnet valve device, and means whereby when both of said relays are deenergized said magnet valve device is deenergized and when one of said relays is energized and the other is deenergized said magnet valve device is energized.

14. In a vehicle brake system, the combination with a wheel adapted to roll on a track rail, of a fluid pressure brake device operable to produce a braking effect on said wheel, electroresponsive means operable to control the supply of fluid under pressure to said brake device, a retardation controller device, means for adjusting the setting of said retardation controller device in accordance with the braking effect produced on said wheel, electromagnet means for controlling said last means, electroresponsive means for maintaining the setting of said retardation controller device when said brake device is released, a source of current supply, a circuit from said source to said magnet valve device, a circuit from said source to said electromagnet means, a circuit from said source to said electroresponsive means, and two slow acting relays controlling opening and closing of said circuits.

15. In a vehicle brake system, the combination with a brake cylinder for braking the vehicle and a wheel adapted to roll on a track rail, of a brake valve device for controlling the supply of fluid under pressure to said brake cylinder, magnet valve means for controlling fluid supplied by said brake valve device, a retardation controller device for controlling said magnet valve means and providing for variable settings thereof, a fluid pressure brake device for producing a braking effect on said wheel independent of that produced on the vehicle, a magnet valve device operable at one time to effect a supply of fluid under pressure to said brake device to a degree sufficient to produce sliding of said wheel and operable at another time to effect a release of pressure from said brake device, means for effecting a setting of said retardation controller device in accordance with the braking effect produced on said wheel, means for retaining the setting of said retardation controller device when said brake device is released, and means for effecting periodic operation of said magnet valve device and said last mentioned means, whereby the setting of said retardation controller device is varied periodically in accordance with the braking effect which produces sliding of said wheel.

16. In a vehicle brake system, the combination with a wheel adapted to roll on a track rail, of a fluid pressure brake device for producing a braking effect on said wheel, a reservoir, means establishing a communication from said reservoir to said brake device, a choke in said communication, a magnet valve device controlling opening and closing of said communication, an element having a biased position, means for actuating said element to other positions corresponding to the braking effect produced by said brake device on said wheel, a retardation controller device having a body movable against opposition of a spring according to the rate of retardation of the vehicle, means for increasing the tension on said spring according to the position of said element, means including an electromagnet operable when said electromagnet is deenergized to maintain said element in the position to which actuated, means including a second electromagnet for maintaining said pressure on said spring when said element returns to said biased position, a source of current supply, circuits connecting said source to said magnet valve device and said electromagnets, and two slow acting relays controlling opening and closing of said circuits and operable to effect cyclic energization and deenergization of said magnet valve device and said electromagnets.

17. In a vehicle brake system, in combination, a fluid pressure brake device, a magnet valve device controlling supply of fluid under pressure to and its release from said brake device, a retardation controller device, means including two electromagnets for effecting a setting of said retardation controller device according to the braking effect which produces sliding of said wheel, a source of current supply, circuits connecting said source to said magnet valve device and to said electromagnets, two slow acting relays controlling opening and closing of said circuits, and means whereby when both relays are in deenergized position one of said electromagnets is energized and when one of said relays is in energized position said last electromagnet is deenergized and the other of said electromagnet is energized and when both of said relays are in energized position said magnet valve device is energized and the other of said electromagnets is deenergized.

18. Brake control means comprising a wheel adapted to roll on a track rail, brake means for producing an increasing retarding torque on said wheel to a degree sufficient to cause said wheel to slip on said rail, the retarding torque existing at the instant said wheel begins to slip being a measure of the coefficient of adhesion between said wheel and rail, an element, and means for positioning said element according to the maximum retarding torque produced.

19. Brake control means comprising a wheel adapted to roll on a track rail, brake means for producing an increasing retarding torque on said wheel to a degree sufficient to cause said wheel to slip on said rail, the retarding torque existing at the instant said wheel begins to slip being a measure of the coefficient of adhesion between said wheel and rail, a spring, and means for compressing said spring to a degree corresponding to the retarding torque at the instant said wheel begins to slip.

20. Brake control means comprising a wheel adapted to roll on a track rail, friction brake means for producing a braking effect on said wheel sufficient to cause said wheel to slide on said rail, an element, and means for positioning said element according to the maximum force reaction between said wheel and rail at the instant before said wheel slides, said means being independent of the speed-friction characteristic of said friction brake means.

21. In a vehicle brake system, in combination, brake means for braking the vehicle, means for effecting an application of said brake means, a wheel adapted to roll on a track rail, means operating at periodic intervals for determining the adhesion between said wheel and rail, and means for controlling the application of said brake means in accordance with the adhesion between said wheel and rail.

22. In a vehicle brake system, in combination, brake means for braking the vehicle, means for effecting an application of said brake means, a wheel adapted to engage a track rail, means operating at periodic intervals for determining the adhesion between said wheel and rail, and means for preventing the application of said brake means from exceeding that corresponding to the adhesion determined between said wheel and rail.

23. In a vehicle brake system, in combination, brake means for braking the vehicle, means for effecting an application of said brake means, an element adapted to engage a track rail, means operating at periodic intervals for determining the adhesion between said element and rail, and means for preventing the application of the brake means from producing a braking effect exceeding that corresponding to the adhesion determined between said element and rail.

JOHN W. LOGAN, Jr.